(12) United States Patent
Heidebrecht et al.

(10) Patent No.: US 12,095,065 B2
(45) Date of Patent: Sep. 17, 2024

(54) ELECTROCHEMICAL ENERGY STORE

(71) Applicant: BASF SE, Ludwigshafen am Rhein (DE)

(72) Inventors: Peter Heidebrecht, Ludwigshafen (DE); Wolfgang Jabczynski, Ludwigshafen (DE); Peter Steigner, Ludwigshafen (DE); Dirk Merkel, Ludwigshafen (DE); Domnik Bayer, Ludwigshafen (DE); Jesus Enrique Zerpa Unda, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 666 days.

(21) Appl. No.: 17/047,537

(22) PCT Filed: Apr. 23, 2019

(86) PCT No.: PCT/EP2019/060294
§ 371 (c)(1),
(2) Date: Oct. 14, 2020

(87) PCT Pub. No.: WO2019/206864
PCT Pub. Date: Oct. 31, 2019

(65) Prior Publication Data
US 2021/0151819 A1    May 20, 2021

(30) Foreign Application Priority Data

Apr. 27, 2018 (EP) .................... 18169811

(51) Int. Cl.
*H01M 10/6566* (2014.01)
*H01M 10/39* (2006.01)
(Continued)

(52) U.S. Cl.
CPC ... *H01M 10/6566* (2015.04); *H01M 10/3909* (2013.01); *H01M 10/613* (2015.04);
(Continued)

(58) Field of Classification Search
CPC ............. H01M 10/613; H01M 10/643; H01M 10/6566; H01M 50/204; H01M 50/213; H01M 50/244; H01M 50/289
See application file for complete search history.

(56) References Cited

U.S. PATENT DOCUMENTS 4,522,898 A    6/1985  Esrom
7,955,725 B2   6/2011  Takagi et al.
(Continued)

FOREIGN PATENT DOCUMENTS

DE    3247969 A1   6/1984
GB    197183 A    5/1923
(Continued)

OTHER PUBLICATIONS

International Search Report for corresponding PCT/EP2019/060294 mailed Jun. 24, 2019, 2 pages.

*Primary Examiner* — Jonathan G Jelsma
(74) *Attorney, Agent, or Firm* — Armstrong Teasdale LLP

(57) ABSTRACT

Described herein is an electrochemical energy store including at least one electrochemical cell and a support structure, wherein the electrochemical cells are accommodated in a suspended manner in the support structure.

10 Claims, 3 Drawing Sheets

Figure 1:
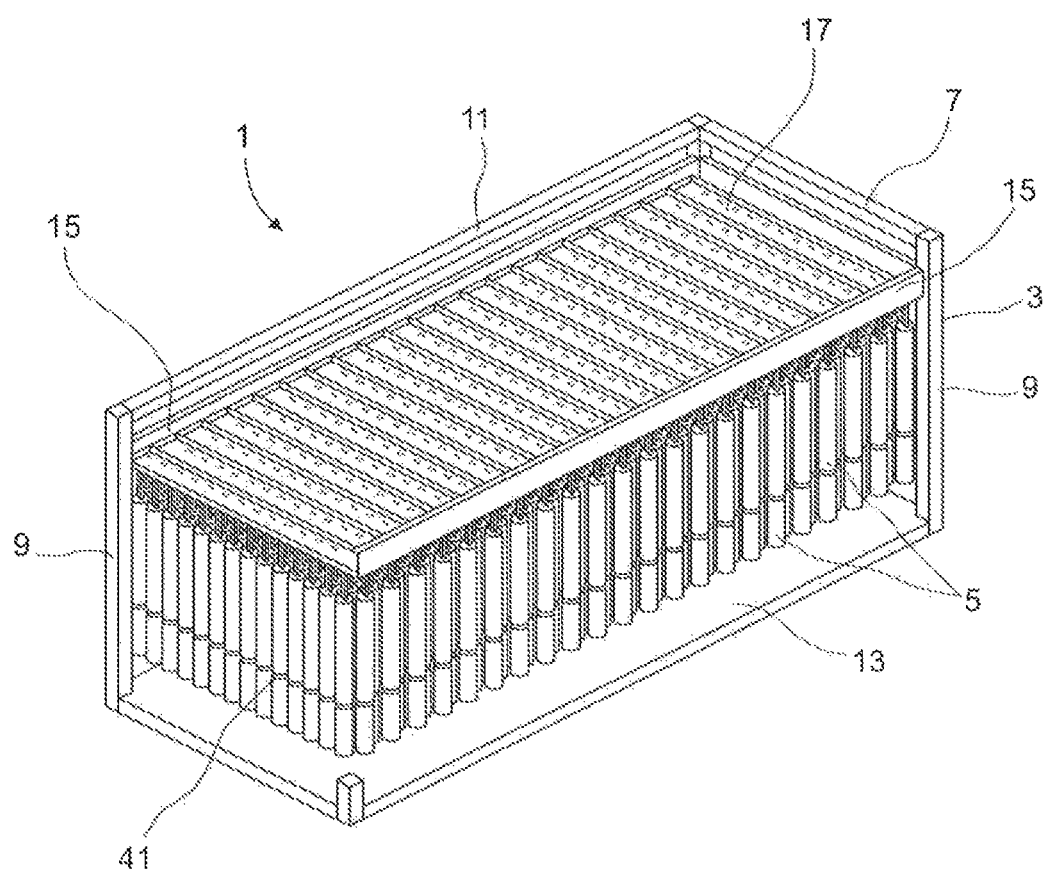

(51) Int. Cl.
  *H01M 10/613* (2014.01)
  *H01M 10/643* (2014.01)
  *H01M 50/204* (2021.01)
  *H01M 50/213* (2021.01)
  *H01M 50/244* (2021.01)
  *H01M 50/289* (2021.01)

(52) U.S. Cl.
  CPC ....... *H01M 10/643* (2015.04); *H01M 50/204* (2021.01); *H01M 50/213* (2021.01); *H01M 50/244* (2021.01); *H01M 50/289* (2021.01)

(56) References Cited

U.S. PATENT DOCUMENTS

| | | | |
|---|---|---|---|
| 2013/0130086 A1* | 5/2013 | Schaefer | H01M 50/211 429/120 |
| 2013/0280564 A1 | 10/2013 | Zheng et al. | |
| 2016/0285140 A1* | 9/2016 | Kimura | H01M 10/6562 |
| 2018/0159099 A1* | 6/2018 | Hsu | H01M 50/516 |
| 2019/0006638 A1 | 1/2019 | Bayer et al. | |

FOREIGN PATENT DOCUMENTS

| | | |
|---|---|---|
| GB | 1386525 A | 3/1975 |
| JP | S59171476 A | 9/1984 |
| JP | H01200571 A | 8/1989 |
| JP | 3009376 U | 4/1995 |
| JP | 2000297989 A | 10/2000 |
| JP | 3121434 U | 5/2006 |
| JP | 2011210455 A | 10/2011 |
| JP | 2013073773 A | 4/2013 |
| JP | 2013161598 A | 8/2013 |
| JP | 2017068986 A | 4/2017 |
| WO | 2017102697 A1 | 6/2017 |

* cited by examiner

ELECTROCHEMICAL ENERGY STORE

CROSS-REFERENCE TO RELATED APPLICATIONS

This application is a U.S. National Phase Application of International Patent Application No. PCT/EP2019/060294, filed on Apr. 23, 2019, which claims the benefit of priority to European Patent Application Number 18169811.9, filed Apr. 27, 2018, the entire contents of which are hereby incorporated by reference herein.

The invention proceeds from an electrochemical energy store having at least one electrochemical cell.

Electrochemical energy stores are generally also referred to as battery or accumulator. Rechargeable batteries or accumulators are, in particular, used in order to be able to store and utilize electric energy. To store large quantities of electric energy, correspondingly powerful rechargeable batteries are required. For this purpose, it is possible, for example, to use batteries based on molten sodium and sulfur. In order to achieve the necessary capacity, a plurality of electrochemical cells which are electrically connected to one another are usually employed in the electrochemical energy stores. Such electrochemical cells which operate on the basis of a molten alkali metal as anode and a cathodic reaction participant, generally sulfur, are described in, for example, WO-A 2017/102697. For this purpose, the molten alkali metal and the cathodic reaction participant are separated by a solid electrolyte which is permeable to cations. A reaction of the alkali metal with the cathodic reaction participant occurs at the cathode. This is, for example when using sodium as alkali metal and sulfur as cathodic reaction participant, the reaction of sodium and sulfur to form sodium polysulfide. To charge the electrochemical energy store, the sodium polysulfide is redissociated into sodium and sulfur at the electrode by introduction of electric energy.

The individual electrochemical cells are usually stacked in battery packs or as an alternative arranged parallel to one another in a housing. However, this arrangement has the disadvantage that uniform temperature control of the individual cells can be achieved only with difficulty. In particular, passing a temperature control medium through the arrangement leads to a temperature increase with increasing distance of flow of the temperature control medium as a result of the heat taken up by the temperature control medium from the individual cells and thus to poorer cooling of the electrochemical cells. However, this is disadvantageous for operation of the electrochemical energy store. In particular, there is a risk that damage to the individual electrochemical cells will occur if the temperature increases too greatly. When this leads to damage to the solid electrolyte, this can result in an uncontrolled reaction which can lead to a fire in the electrochemical energy store, which can be controlled only with difficulty.

Corresponding energy stores comprising sodium-sulfur batteries are described, for example, in JP-A 2000-297989 or U.S. Pat. No. 7,955,725.

It is an object of the present invention to provide an electrochemical energy store comprising electrochemical cells, in which uniform temperature control is possible.

This object is achieved by an electrochemical energy store comprising at least one electrochemical cell and a support structure, wherein the at least one electrochemical cell is accommodated in a suspended manner in the support structure.

Differently from horizontal or upright electrochemical cells, it is possible for a temperature control medium to be passed uniformly around the suspended electrochemical cells, so that the latter are cooled uniformly. In particular, it is possible to realize flow of the temperature control medium parallel to the cells in a simple manner as a result of the temperature control medium flowing from the top downward or as an alternative from the bottom upward. A further advantage is that in the event of possible damage to an individual electrochemical cell, the starting materials used and the reaction product flow downward onto the plate underneath the cells, which can, particularly in the case of highly reactive components, offer additional safety since the heat arising in the reaction is not transferred directly to the adjacent cells. In addition, the material which has run out from an electrochemical cell in the case of such damage can easily be disposed of. A further great advantage is that the support structure used, in particular the supporting parts of the support structure, do not come into contact with the reactants used in the electrochemical cells if damage occurs to individual cells and the reactants used run out. This firstly increases the safety of the construction since in the case of damage to individual electrochemical cells, the construction is not all damaged. Secondly, it is also possible to use relatively simple construction materials, in particular carbon steel, instead of stainless steel, which is stable to corrosion by the reactants used, for the support structure.

In order to make simultaneous flow of a temperature control medium around the electrochemical cells possible, it is advantageous for the support structure together with the electrochemical cells accommodated therein in a suspended manner to be enclosed by a housing. The housing wall could be made of any material. Depending on the size of the electrochemical cells and the number of electrochemical cells, it is possible, for example, for the housing to be made of a metal, in particular steel, or else, as an alternative, for a masonry construction to be provided as housing in the case of a large electrochemical energy store. In order to make a large electrochemical energy store transportable, it is also possible, as an alternative, to use a housing similar to a standard shipping container, for example a 20 foot container or a 40 foot container. These can then be moved by means of the customary transport means employed to transport such standard shipping containers. A further advantage of the use of such standard shipping containers is that a plurality of such containers can be connected to form a large energy store in order to provide a greater storage capacity or a higher available power of the electrochemical energy store. Owing to the high temperatures at which alkali metal-sulfur cells, in particular sodium-sulfur cells, are operated, it is also advantageous for the housing to be thermally insulated. The thermal insulation can be applied both to the inside of the housing and to the outside of the housing. It is also possible to provide a double wall for the housing and to install the insulation between the walls.

In order to allow simple assembly of the electrochemical energy store, preference is given to the support structure comprising at least one frame having a holding device in which the electrochemical cells are suspended. The use of a frame having an additional holding device in which the electrochemical cells are suspended makes it possible to carry out preassembly outside the housing. In this case, the electrochemical cells are firstly introduced into the holding device and the latter is joined to the frame. As an alternative, it is also possible for the holding device firstly to be introduced into the frame and the holding device then to be provided with the electrochemical cells. In a next step, the frame together with the holding device with the electrochemical cells accommodated therein is then introduced into a main framework which is likewise part of the support structure.

To allow simple assembly, the main framework preferably has rails onto which the at least one frame is pushed. The use of rails additionally assists the assembly of the electrochemical energy store.

As rails on the main framework of the support structure, it is possible to use, for example, conventional U-profiles or L-profiles. Here, it merely has to be ensured that the rails run parallel to one another so that the frames do not either jam or fall through between the rails when being pushed onto the rails due to possible varying spacings.

The number of electrochemical cells provided per frame is dependent on the size of the electrochemical cells used. The electrochemical cells used in the electrochemical energy store are particularly preferably sodium-sulfur cells. Such sodium-sulfur cells are usually cylindrical and have a diameter in the range from 6 to 20 cm and a length in the range from 50 to 200 cm. Corresponding sodium-sulfur cells are known to those skilled in the art and are, for example, described in WO-A 2017/102697.

The holding device on which the electrochemical cells are suspended is preferably a plate in which there are cut-outs in which the electrochemical cells are hung. The use of a plate having cut-outs in which the electrochemical cells are hung as holding device allows uniform flow of the temperature control medium through the housing in which the support structure is accommodated. The temperature control medium is for this purpose fed in above the plates, with the space in the housing above the plates acting as distributor. The temperature control medium then flows uniformly through the cut-outs in the plates into the region in which the electrochemical cells are suspended. The temperature control medium flows through this from the top downward uniformly over the entire cross-sectional area of the electrochemical energy store in a direction parallel to the suspended electrochemical cells. In order to obtain uniform flow from the top downward over the entire length of the cells, it is also possible to provide a further plate with openings underneath the cells, underneath which point the temperature control medium collects and is then taken from the housing. In the case of sufficiently dense packing of the electrochemical cells, in which the electrochemical cells almost touch, it is also possible to utilize the space underneath the cells as collector since the temperature control medium will essentially flow from the top downward between the cells through the channels formed because of the cylindrical shape of the cells.

In order to suspend the electrochemical cells in a stable manner in the holding device and in particular prevent them from moving in the case of movement of the holding device, for example when the latter is pushed into the main framework, or in the case of movement of the housing, and there being a risk of electrochemical cells falling out of the holder as a result, the holding devices should be configured so that falling-out of the cells is prevented. This can be achieved, for example, by each holding device preferably having an opening and a slot adjoining the opening and also a bracket which includes an angle to the surface of the plate in the range of at least 45°, preferably in the range from 90 to 180°, with the bracket being arranged on the side of the opening facing the slot. In this case, a support on the electrochemical cell is, for assembly, threaded through the opening over the bracket and in the assembled state projects downward through the slot behind the bracket. The bracket then prevents the suspension of the electrochemical cell being able to slip. For mounting in a corresponding holding device, the suspension of the electrochemical cell has a bracket bent through at least 90° at its corner facing away from the electrochemical cell. The suspension is then passed through the slot and the bracket rests on the plate used as holding device. For this purpose, the bracket is particularly preferably bent through 90°.

In order to produce the cut-outs having an opening and a slot adjoining the opening and also a bracket which includes an angle to the surface of the plate, in the plate, preference is given to introducing a U-shaped slot into the plate at the respective positions at which the electrochemical cells are to be suspended, with one leg of the U-shaped slot being twice as long as the other. The bracket produced in this way between the two legs of the U-shaped slot is then bent upward at a bending edge which runs parallel to the base of the U-shaped slot. As an alternative, it is of course also possible to cut out the entire opening and subsequently weld on a bracket. However, preference is given to forming a U-shaped slot and bending the bracket in an upward direction.

In order to allow preassembly outside the housing, it is necessary to make the frames and the holding device of such a size that is still handlable. The individual electrochemical cells are preferably suspended in parallel rows in the holding device. In the case of sodium-sulfur cells as electrochemical cells, each frame is preferably provided with from 6 to 60 cells. These are preferably suspended in from 1 to 5 rows, in particular in 1 or 2 rows, with from 5 to 20 electrochemical cells and in particular from 8 to 12 electrochemical cells being suspended in each row. The advantage of only 1 or 2 rows per frame is that each cell is directly accessible after taking out a frame. The number of electrochemical cells per row still allows good handleability of the individual frames. The number of cells per row in the range from 5 to 20 and preferably from 8 to 12 also prevents sagging of the holding device.

When a plate with openings is used as holding device, the thickness of the plate is selected so that, depending on the number of electrodes suspended in the plate, stable holding is possible, i.e. holding of the cells without the plate sagging. When using sodium-sulfur cells and from 1 to 5 rows per cell each having from 5 to 20 electrochemical cells, the thickness of the plate used as holding device is preferably in the range from 2 to 10 mm.

As an alternative to the plates having openings as holding device, it is also possible to use supports on which the individual electrochemical cells are hung. Suitable supports in this case are, for example, double-U-supports, T-supports, L-supports or else hollow profiles having any cross-sectional shape. In order to prevent the electrochemical cells from being able to slip on the supports or slip off from the latter, the suspensions of the electrochemical cells each have a hook which is preferably matched to the geometry of the support. In addition, it is advantageous to provide the supports with stops which are in each case arranged on both sides of the suspension of the electrochemical cell so that sideways slipping of the electrochemical cells is blocked by the stops. The stops can be joined to the support either positively, for example by welding, soldering or adhesive bonding, or else frictionally, for example by screwing.

However, preference is given to using a plate having openings as holding device.

In order to prevent the individual electrochemical cells from knocking against one another during assembly or during transport of the electrochemical energy store, the electrochemical cells preferably each have a spacer at their lower end. As spacers, it is possible to use, for example, rings which enclose the electrochemical cells at their lower end. The rings are preferably made of a heat-resistant, electrically nonconductive material, for example a mineral fiber material. As an alternative, it is also possible to provide a plate having cut-outs through which the electrochemical cells are passed as spacer. By means of such a plate, the individual electrochemical cells would be fixed in their position and could no longer move. However, preference is given to each cell being provided with a separate spacer in order to allow simple replacement of individual electrochemical cells.

As an alternative to a ring which is composed of a heat-resistant, electrically nonconductive material and encloses the electrochemical cell, it would also be possible to provide brackets which are fastened directly to the electrochemical cell as spacers and preferably to coat each bracket with an insulating material in order to prevent adjacent cells from being able to be damaged by the spacers.

In order to be able to control the temperature of the electrochemical cells, i.e. heat or cool them as required, the housing preferably has an inlet and an outlet for the temperature control medium. The inlet for the temperature control medium is particularly preferably located above the electrochemical cells and the outlet is located underneath the electrochemical cells. When plates with openings in which the electrochemical cells are suspended are used for suspending the electrochemical cells, these plates act as distributors for the temperature control medium, so that the temperature control medium flows uniformly around all electrochemical cells within the housing. The inlet for the temperature control medium is in this case located above the plates. To prevent the temperature control medium which has flowed through the plates serving as distributors from flowing directly to the outlet for the temperature control medium rather than the temperature control medium flowing parallel to the electrochemical cells downward through the housing, it is possible to use a plate having cut-outs, for example underneath the electrochemical cells, and to position the outlet underneath this plate. As an alternative, it is also possible to configure the spacers of the electrochemical cells in such a way that they leave open individual openings between the electrochemical cells so that a collector via which the temperature control medium can then be taken off is formed underneath the spacers.

In order to achieve uniform distribution of the gas flow over the electrochemical cells, the openings are preferably made sufficiently small to produce a pressure drop which is significantly above the pressure differences in the distributor space above the plate having openings. As an alternative, it is also possible to provide different sizes for the openings over the length of the module in order to achieve a uniform gas flow. However, preference is given to making the openings so small that a pressure drop which is significantly above the pressure differences in the distributor space is produced.

If it is not possible to produce uniform gas flow through the holding device for the electrochemical cells, for example when supports are used instead of a plate having openings or when the openings have to be made so large that the pressure drop through the openings is too small to produce uniform flow, it is also possible to provide an additional gas distributor above the holding device for the electrochemical cells. For this purpose, it is possible to use, for example, a plate having openings or else a plate having valves. A plate having openings by means of which uniform gas flow over the electrochemical cells is produced is preferred as gas distributor. When an additional gas distributor is used, it is also possible, as an alternative, to provide this underneath the electrochemical cells and direct the gas flow from the bottom upward. However, preference is given to a gas distributor above the electrochemical cells and gas flow from the top downward.

When sodium-sulfur cells are used as electrochemical cells, heating is initially necessary for start-up. Here, it is necessary to increase the temperature of the individual electrochemical cells to a temperature which is above the melting point of the reactants. As soon as the reactants have melted and the electrochemical cell can be taken into operation, heat is liberated in the cells on charging or discharging, so that cooling of the electrochemical cells is generally necessary.

Preference is given to using a gas as temperature control medium for the electrochemical cells. Particular preference is given to gases which are inert toward the reactants used, i.e. alkali metals, in particular sodium, sulfur and the corresponding alkali metal polysulfide. Suitable gases are, in particular, nitrogen, carbon dioxide or noble gases.

In order to heat the gas to the temperature necessary for taking the electrochemical energy store into operation or to remove the heat liberated within the electrochemical cells during operation, a channel to which the inlet and outlet for the temperature control medium outside the housing are connected is present, with a heat exchanger and a transport device for the temperature control medium being accommodated in the channel. When gases are used as temperature control medium, a blower is utilized as transport device. This has to be configured so that it withstands the temperatures during operation of the electrochemical energy store. As heat exchangers, it is possible to use any heat exchangers known to a person skilled in the art by means of which gases can be heated or alternatively cooled. Suitable heat exchangers are, for example, plate heat exchangers or shell-and-tube heat exchangers. In order to increase the heat transfer area, the individual tubes or plates of the heat exchanger can be provided with additional fins. To heat the gas, it is possible to use not only a heat exchanger but also any other heating device, for example an electric heating appliance.

As heat transfer medium by means of which the temperature control medium used for controlling the temperature of the cells is cooled or heated, it is possible to use any temperature control medium which is stable at the appropriate temperature. Synthetic heat transfer oils or gases are particularly suitable here.

Embodiments of the invention are depicted in the figures and are explained in more detail in the following description.

Figure 2:
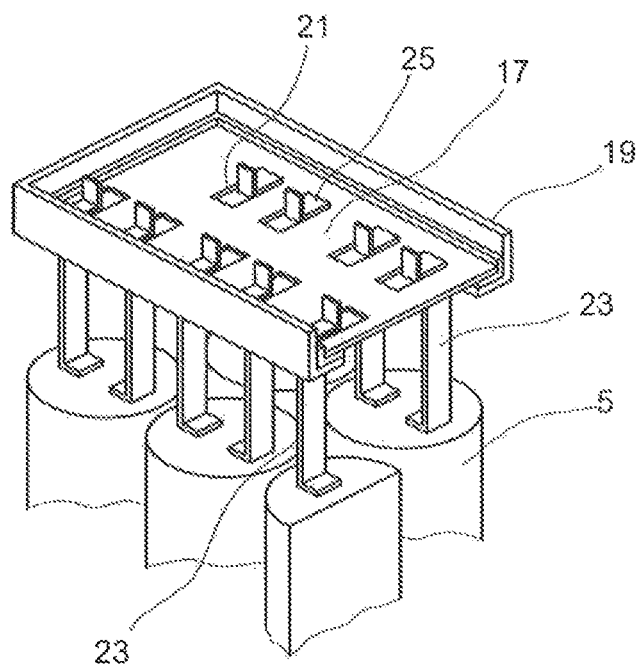
Figure 3:
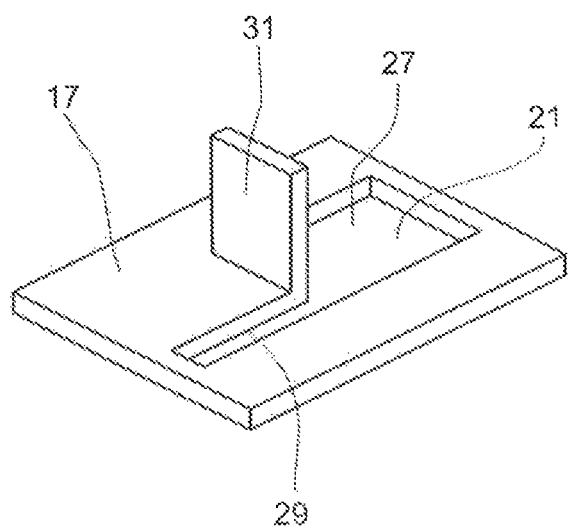
Figure 4:
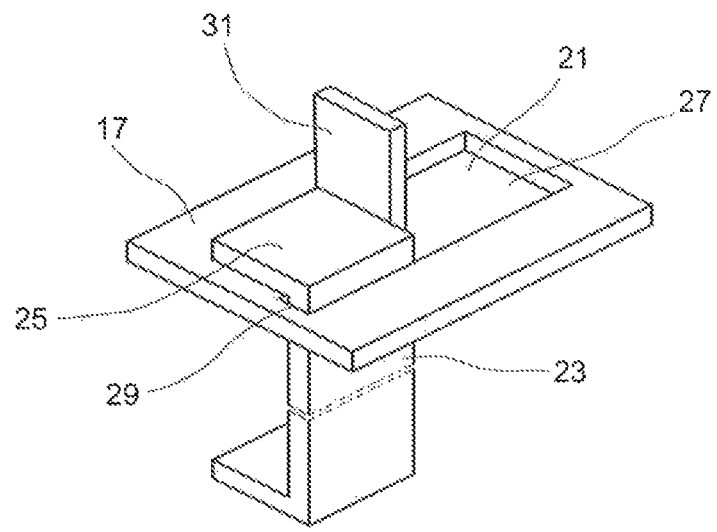
Figure 5:
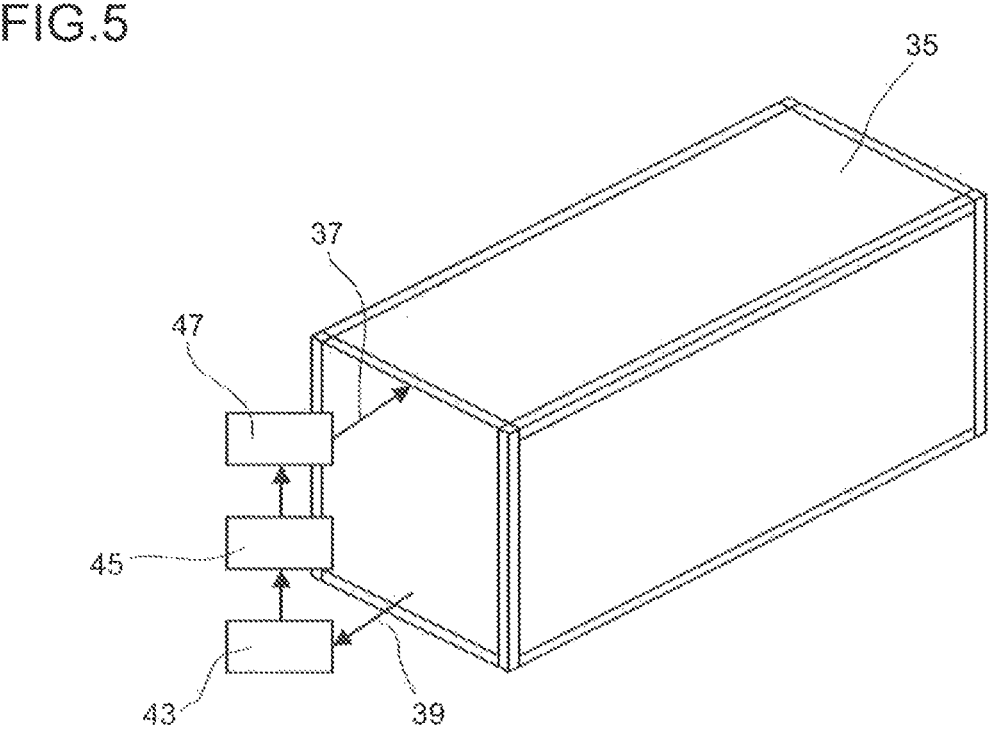

The figures show:

FIG. 1 an electrochemical energy store comprising a plurality of electrochemical cells, FIG. 2 a section of a support structure for the electrochemical cells, FIG. 3 an opening in a holding device for accommodating an electrochemical cell, FIG. 4 the opening depicted in FIG. 3 with a bracket accommodated therein for fastening the electrochemical cells, FIG. 5 an electrochemical energy store having a temperature control circuit which is shown schematically.

FIG. 1 shows an electrochemical energy store having a plurality of electrochemical cells in a three-dimensional depiction.

An electrochemical energy store 1 comprises a support structure 3 with electrochemical cells 5 fastened in a suspended manner in the support structure 3.

The support structure 3 comprises a main framework 7 with struts 9. The struts 9 are connected to cross-bearers 11. In addition, the support structure 3 in the embodiment shown here comprises a bottom plate 13. However, it is also possible to provide, for example, cross struts as an alternative to the bottom plate 13.

To assist clarity, the front right-hand strut is shown cut off in FIG. 1. To give a statically stable main framework 7, all struts 9 at the corners of the main framework 7 preferably have the same configuration. The individual struts 9 can, for example, as shown here, be configured as square tubes. As an alternative, it is also possible to make the struts 9 solid or configure them in the form of L-, T- or double-T-profiles. It is also possible to use hollow profiles having any other cross section, for example a round cross section. However, preference is given to configuring the struts 9 as square hollow profiles.

The cross-bearers 11 can, like the struts 9, have any shapes, for example hollow profiles having any cross section, e.g. round profiles or square profiles, with square hollow profiles also being preferred here. Apart from the hollow profiles mentioned, it is also possible here to use L-, T-, U- or double-T-profiles for the cross bearers 11.

Rails 15 are additionally provided on the main framework 7 for accommodating the electrochemical cells. Holding devices 17 for the electrochemical cells 5 are pushed onto the rails 15. The rails 15 here are preferably L-profiles or U-profiles.

In the embodiment depicted here, the rails are installed along the long sides of the main framework 7. This has the advantage that the holding device 17 can be kept shorter than when it is pushed in transversely over the long side of the main framework 7, so that sagging of the holding device 17 is reduced or advantageously prevented here.

When it is necessary to push the holding device 17 in over the long side of the main framework 7, the long side is preferably subdivided by means of additional struts 9, so that a plurality of holding devices 17 are pushed next to one another into the main framework 7. Depending on the length of the main framework 7, it is thus possible, for example, to push two, three or more holding devices 17 next to one another into the main framework.

A section of a support structure for the electrochemical cells is depicted in FIG. 2.

Apart from the holding device 17, the support structure preferably additionally comprises a frame 19 on which the holding device 17 rests. The holding device 17 is preferably, as shown here, a plate with cut-outs 21.

In order to allow simple placement of the holding device 17 configured as plate in the frame 19, the frame is preferably, as shown here, made up of L-profiles.

The electrochemical cells 5 each have two suspensions 23 in the embodiment shown here. The suspensions 23 are passed through the cut-outs 21 and rest with a bracket 25 on the holding device 17 configured as plate. More stable suspension of the individual electrochemical cells 5 is achieved by the use of two suspensions 23, so that the cells can as a result swing to a lesser degree than when only one suspension 23 is provided. Of course, it is also possible, as an alternative, to provide only one suspension 23 or else more than two suspensions 23.

To assemble the electrochemical energy store 1, the frame 19 provided with the holding device 17 configured as plate and the electrochemical cells 5 is then pushed onto the rails 15 of the main framework 7.

A possible embodiment of a cut-out 21 in which a suspension 23 is accommodated in shown in detail in FIG. 3.

The cut-out 21 formed in the holding device 17 configured as plate has an opening 27 and a slot 29 adjoining the opening 27. In addition, a bracket 31 is arranged on the end of the opening 27 facing the slot 29, with the bracket 31 preferably including an angle to the surface of the holding device 17 configured as plate in the range from 45 to 180° and particularly preferably 90°. When an electrochemical cell is hung in, the bracket 31 acts as catch which prevents the electrochemical cell from being able to slip out of the holding device.

FIG. 4 shows the cut-out 21 depicted in FIG. 3 with a suspension 23 accommodated therein. The suspension 23 has the bracket 25 which is bent through essentially 90° and on which the holding device 17 configured as plate rests. The bracket 25 of the suspension 23 being in juxtaposition with the bracket 31 which is bent upward prevents the suspension 23 from being able to slip in the direction of the opening 27 and falling out through the opening 27. Here, the suspension 23 is passed through the slot 29.

Apart from the embodiment shown here, in which the suspension 23 is configured as strip having a rectangular cross section, any other cross-sectional shape is possible for the suspension 23. Thus, it can also be configured, for example, as wire having a round cross section or else as a plurality of wires which are arranged next to one another and are also joined to further transverse wires. Any other configuration is also possible for the suspension 23. However, owing to the simple method of manufacture, a configuration as strip, as depicted here, is preferred.

To produce the cut-out 21, it is possible to cut this out completely and subsequently attach the bracket 31 at the end of the opening 27 facing the slot 29, with the bracket 31 in this case being able, for example, to be welded on, soldered on, adhesively bonded on, or else screwed or riveted on. However, preference is given to introducing a U-shaped slot into the holding device 17 configured as plate, with one leg of the U-shaped slot being at least twice as long as the other leg. At a bending edge running parallel to the base of the U-shaped slot at the end of the shorter leg, the bracket 31 is then bent upward. This avoids having to attach a dedicated bracket 31 on each cut-out 21.

If the individual cut-outs 27 are to be stamped out of the holding device 17 configured as plate, it is also possible however to provide any other stop which prevents the suspension 23 from slipping out of the slot 29 into the opening 27 and thus being able to slip off from the holding device instead of the bracket 31 shown here. When such a stop different from a bracket 31 is attached, it can, as described above, be joined on to the holding device 17 configured as plate by, for example, welding, adhesive bonding, soldering, screwing or riveting.

Since heat is usually liberated during charging and during discharging regardless of the type of electrochemical cells, cooling is necessary in order to prevent overheating of the individual electrochemical cells. In addition, when alkali metal-sulfur cells are used, it is necessary to bring the electrochemical energy store to operating temperature, i.e. a temperature which is above the melting point of sodium and sulfur, before being taken into operation. For this purpose, control of the temperature of the electrochemical energy store is required.

Such temperature control is usually effected via a temperature control circuit as is schematically shown in FIG. 5.

In order to be able to control the temperature of the electrochemical cells of the electrochemical energy store, the electrochemical energy store has a housing 35. The housing 35 encloses the main framework 7 together with the electrochemical cells 5 suspended therein. In order to increase the energy efficiency of the energy store, the housing 35 is preferably thermally insulated. The thermal insulation can be installed on the inside of the individual housing walls or on the outside. As an alternative, it is also possible to make the housing 35 out of a thermally insulating material. The housing 35 can, for example, be made of metal sheets, in particular steel sheets, which are thermally insulated on the inside or on the outside. For the thermal insulation, it is possible to use any insulation material known to a person skilled in the art. As an alternative, it is also possible to make the housing out of a mineral material, for example as masonry. However, the advantage of the housing 35 made of steel sheets is that in this case it is possible to provide a transportable electric energy store, while an electrochemical energy store at a fixed position can also be enclosed by a masonry housing 35.

The housing 35 has an inlet 37 and an outlet 39 for a temperature control medium. In order to obtain uniform temperature control of the individual electrochemical cells, the temperature control medium preferably flows around these from the top downward. In order to obtain uniform flow of the temperature control medium around all electrochemical cells, the inlet 37 is preferably located above the holding device 17. If the holding device 17 is configured as plate with cut-outs 21 formed therein, the holding device at the same time acts as distributor for the temperature control medium. The space above the holding devices serves as distributor and the temperature control medium flows through the cut-outs 21 onto the electrochemical cells 5. The outlet 39 is then present underneath the electrochemical cells 5. In order to prevent transverse flow, it is also advantageous for a perforated plate underneath which the temperature control medium is collected to be provided underneath the electrochemical cells 5. As an alternative, sufficiently dense equipping with electrochemical cells 5 is also possible, so that adjacent electrochemical cells 5 virtually touch and channels through which the temperature control medium flows from the top downward are formed between the electrochemical cells. For the present purposes, "almost touch" means that the distance is made as small as possible but remains sufficiently large for the adjacent electrochemical cells 5 not to come into contact, in order to avoid a short circuit. The temperature control medium then collects underneath the electrochemical cells and can be taken off via the outlet 39.

To prevent the individual electrochemical cells from knocking against one another during, in particular, assembly of the electrochemical energy store 1 or during transport of the electrochemical energy store 1 or else to prevent the electrochemical cells from coming into contact during operation, the cells are preferably provided with a spacer at their lower end. As spacer, it is possible to use, for example, a ring 41 as is depicted schematically in FIG. 1. The ring 41 is preferably made of a heat-resistant, nonconductive material which has to be stable at the temperatures arising in the housing 35. However, as an alternative to a ring 41, spacers which are coated with an elastic material in order to avoid damage on contact with adjacent cells can also be attached directly as spacers to the individual electrochemical cells. Furthermore, it is also possible to provide a plate having openings through which the electrochemical cells are passed. Here, further openings through which the temperature control medium can flow are additionally provided in order to make temperature control of the electrochemical cells possible.

The temperature control medium taken off from the housing 35 via the outlet 39 is then conveyed through a heat exchanger 43, a heating device 45 and a transport device 47 and subsequently reintroduced into the housing 35 via the inlet 37. The heat exchangers 43, the heating device 45 and the transport device 47 are preferably arranged in a channel which can be configured as pipe or else as channel having any other cross section, for example as rectangular channel.

The heat exchanger 43 serves, in particular, to cool the temperature control medium when the temperature control medium is used for cooling the electrochemical cells, as is necessary, for example, in the case of alkali metal-sulfur cells during the charging and discharging processes. Here, the temperature control medium transfers heat to a further temperature control medium in the heat exchanger 43; for example, water or any other customary temperature control medium, for example a heat transfer oil, can be used here as temperature control medium.

When heat has to be supplied either for operation of the electrochemical cell or else for start-up of the electrochemical cell, the heating device is provided. The temperature control medium is heated in the heating device. Heating can occur directly or indirectly, with indirect heating being effected, for example, by use of a temperature control medium which transfers heat to the temperature control medium in order to control the temperature of the electrochemical cells. However, only temperature control media which are stable at temperatures above the temperature to which the temperature control medium is to be heated can be used here. Suitable heating media would be, for example, salt melts. Preference is therefore given to using a heating device in which the temperature control medium is heated electrically or inductively or else by combustion of a fuel.

As an alternative to the embodiment with heat exchanger 43 for cooling and a separate heating device 45 as depicted here, it is also possible to use only one heat exchanger which is used both for heating and for cooling. For this purpose, the temperature of the temperature control medium can be varied either for heating and for cooling or use is made of a combination appliance which cools by means of one temperature control medium and for heating comprises additional electric heating elements by means of which the temperature control medium can be heated when required for controlling the temperature of the electrochemical cells.

The transport device 47 is dependent on the temperature control medium used. A gas is usually used as temperature control medium for controlling the temperature of the electrochemical cells 5, so that the transport device 47 is a blower.

To prevent a chemical reaction from occurring in the event of damage to an electrochemical cell, a gas which is inert toward the reactants used in the electrochemical cells is used as temperature control medium. Preferred temperature control media are nitrogen, carbon dioxide or noble gases such as argon. Particular preference is given to nitrogen.

The transport device 47 is dimensioned so that an amount of temperature control medium sufficient for controlling the temperature of the electrochemical cells can be conveyed through the housing 35.

LIST OF REFERENCE NUMERALS

1 Electrochemical energy store
3 Support structure

5 Electrochemical cell
7 Main framework
9 Struts
11 Cross-bearer
13 Bottom plate
15 Rail
17 Holding device
19 Frame
21 Cut-out
23 Suspension
25 Bracket
27 Opening
29 Slot
31 Bracket
35 Housing
37 Inlet
39 Outlet
41 Ring
43 Heat exchanger
45 Heating device
47 Transport device

The invention claimed is:

1. An electrochemical energy store comprising at least one electrochemical cell and a support structure, wherein the at least one electrochemical cell is accommodated in a suspended manner in the support structure and the support structure together with the at least one electrochemical cell accommodated therein in a suspended manner is enclosed by a housing, wherein the housing has an inlet and an outlet for a temperature control medium, wherein the support structure comprises at least one frame with a holding device, in which the at least one electrochemical cell is suspended, and the holding device is a plate, in which cut-outs in which the at least one electrochemical cell is hung have been formed, wherein the cut-outs further are configured such that the temperature control medium flows uniformly through the housing in which the support structure is accommodated.

2. The electrochemical energy store according to claim 1, wherein the cut-outs each comprise an opening, a slot adjoining the opening, and a bracket which includes an angle to a surface of the plate in a range from 45 to 180, with the bracket being arranged on a side of the opening facing the slot.

3. The electrochemical energy store according to claim 1, wherein the at least one electrochemical cell each have a suspension which at an end of the suspension facing away from the electrochemical cell has a bracket bent through at least 90°.

4. The electrochemical energy store according to claim 3, wherein the suspension of the at least one electrochemical cell has been passed through a slot and rests with the bracket bent through 90° on a plate.

5. The electrochemical energy store according to claim 1, wherein the support structure comprises a main framework having rails onto which at least one frame has been pushed.

6. The electrochemical energy store according to claim 1, wherein the at least one electrochemical cell each have a spacer at a lower end of the at least one electrochemical cell.

7. The electrochemical energy store according to claim 1, wherein the inlet and the outlet are arranged so that the temperature control medium flows from a top downward along the at least one electrochemical cell.

8. The electrochemical energy store according to claim 1, wherein the inlet for the temperature control medium is arranged above the holding device.

9. The electrochemical energy store according to claim 1, wherein a channel to which the inlet and the outlet for the temperature control medium are connected outside a housing is provided, with a heat exchanger and a transport device for the temperature control medium being accommodated in the channel.

10. The electrochemical energy store according to claim 1, wherein the at least one electrochemical cell is sodium-sulfur cells.

* * * * *